July 16, 1968  R. BARTHOLOMEW  3,392,648
TRACKING OR SCANNING DEVICE
Filed Oct. 21, 1965  2 Sheets-Sheet 1

INVENTOR.
RALPH BARTHOLOMEW

INVENTOR.
RALPH BARTHOLOMEW 3,392,648
TRACKING OR SCANNING DEVICE
Ralph Bartholomew, 33 Walbrook Road,
Scarsdale, N.Y. 10583
Filed Oct. 21, 1965, Ser. No. 499,911
5 Claims. (Cl. 95—18)

ABSTRACT OF THE DISCLOSURE

A linkage is described for moving two elements parallel to each other through proportional distances. More particularly a camera back and lens board for taking pictures through a lined for lenticular screen so that when a print is viewed through a corresponding screen a stereoscopic effect is obtained. The camera back and lens board move on sliders on parallel tracks on a board. The first slider has a swivel and a rod pasing therethrough, the rod being incapble of longitudinal sliding through the swivel point and having a threaded end engaging a second slider on which the lens board moves. Turning of the rod effects initial focusing. Then as the camera back is moved along the first track one or two driving rods move the second slider also along its track but a proportional distance depending on the distances of the sliders from the swivel point. Motion of the lens board is always parallel to the camera back as the second slider slides at right angles on two guide rods. The motion may also vary the longitudinal distance of the lens block by a suitable link and cam. As a result, as the camera back and lens board move across on their tracks focusing is maintained constant.

Background of the invention

The stereoscopic effect from a single photograph in a single plane has been produced by superimposing on the image produced by special scanning of a line or lenticular screen on transparent material, such as plastic or glass. Objects at different distances from a primary focal plane of the scene photographed will be recorded on the photograph at slightly different positions so that when the photograph is viewed through the suitable viewing screen, normally in contact with the photograph or even integral with the print, they will be perceived slightly differently by the two eyes of the person viewing the photograph, and hence the well known phenomenon of stereoscopic or binocular vision results and the photographic image appears to have depth just as if there were two stereoscopic photographs viewed through suitable steretoscopic viewers.

In the past a linkage has been proposed in which a camera scans around the arc of a circle with the axis of the camera and lens always pointing to the central point of focus of the object being photographed. A typical linkage of this type is described and claimed in the patent to Friedmann, 2,175,114. This requires a lined taking screen and also a viewing screen superimposed or in close proximity to the final photograph. Stereoscopic effects are produced but the definition is precise only for single object distance. The linkage of the present invention, which can be used with a lenticular screen, the cylindrial lentiular lenses normally being vertical and of course very tiny, produces motion of the camera back containing the photographically sensitive surface and the camera lens along two parallel lines.

The action of the scanning camera can be thought of, in oversimplified terms of course, as if the camera were moved to successive positions while maintaining the desired focus. In the different positions rays of light coming through the lenticular screen will come from slightly different angles depending on the location of the various objects in the field being scanned with respect to the plane of central focus. Then when the same lenticular viewing screen is used to view the final photograph, as different parts of the picture are viewed by each eye or different portions thereof are so viewed, the stereoscopic effect results.

While it is an advantage of the present invention that it can be used with a lenticular screen which the scanning mechanisms and linkages in the past were unable to do, it should be understood that the present invention can also be used with lined screens. It will be noted that the movement of the camera lens in a line parallel to the camera back constantly changes its orientation with respect to the rays coming from different parts of the scene being scanned and this produces the stereoscopic effect.

Brief descritpion of the drawings

Figure 1:
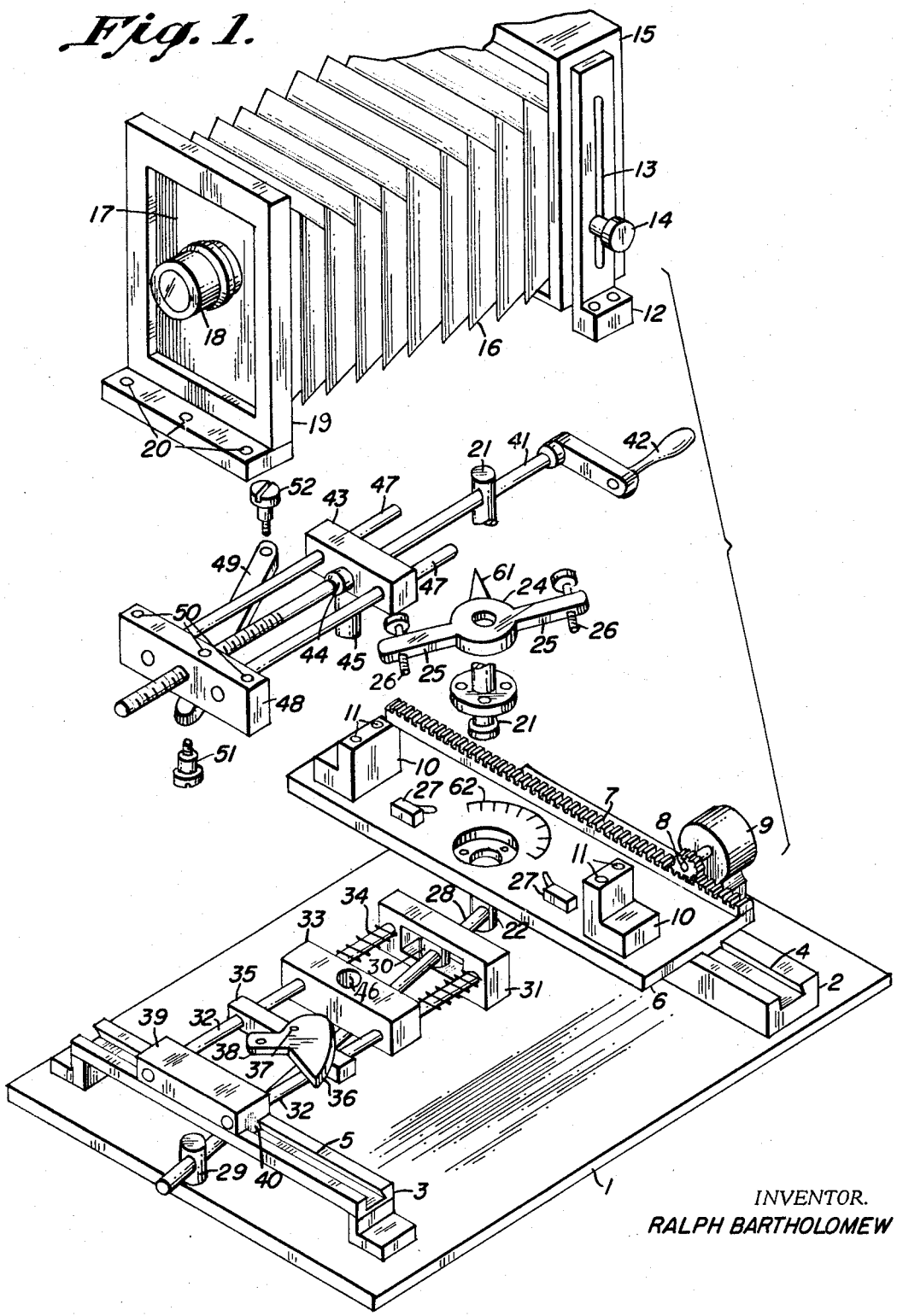
Figure 2:
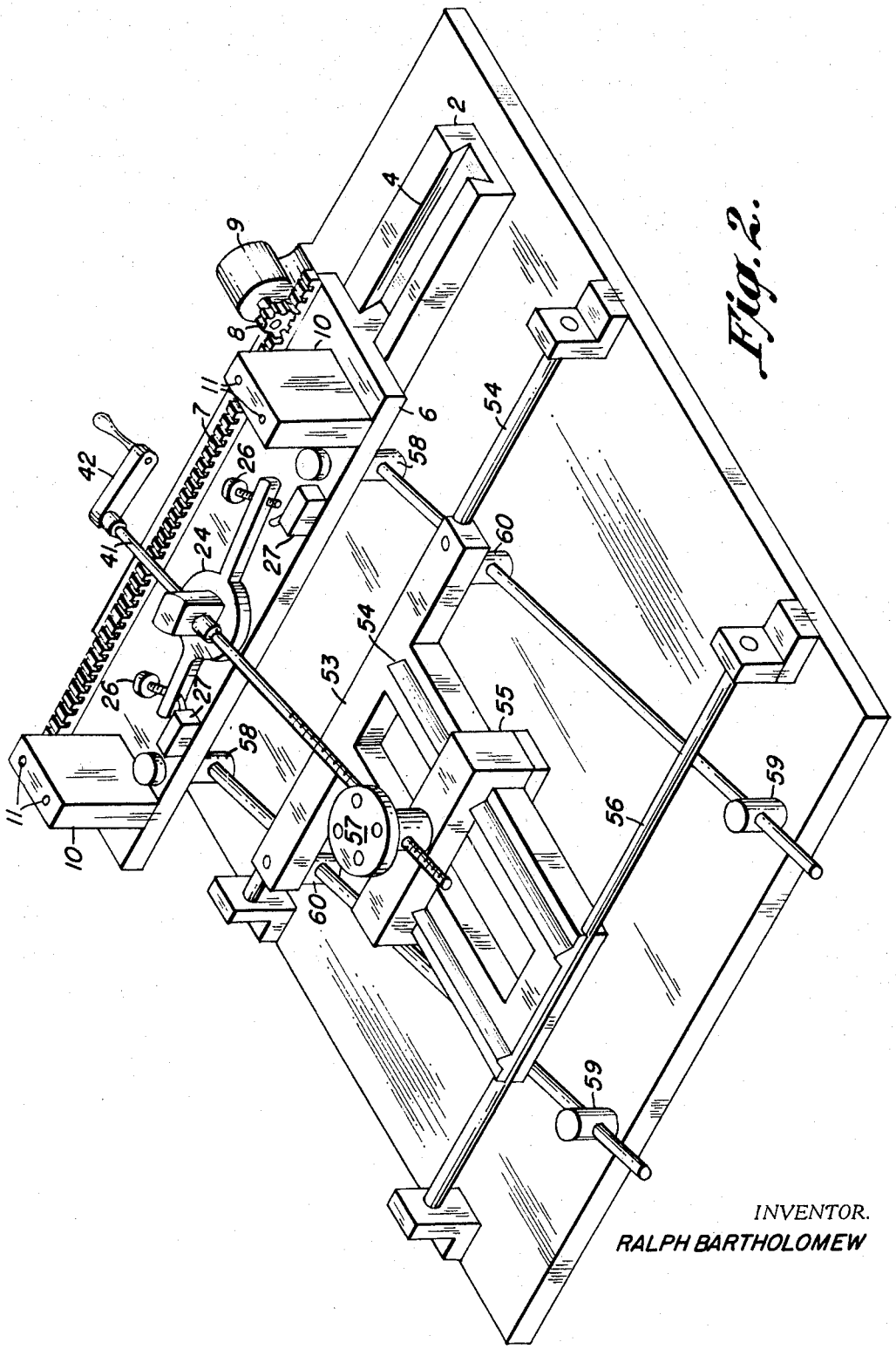

FIG. 1 is an exploded isometric view of one form of linkage used with a camera and automatic focusing, and
FIG. 2 is a similar isometric view of a modified linkage.

Description of the preferred embodiments

Both figures of the drawing are in semi-diagrammatic form as the exact shape and design of the mechanical elements is to a large extent immaterial. The elimination of a more precise pictorial representation of structure makes the operation clearer. As many elements in both figures are the same, they will be given the same reference numerals in each figure.

Turning now to FIG. 1, there is provided a rigid baseboard 1 on which are mounted two tracks 2 and 3 provided with dovetail grooves 4 and 5. In groove 4 a large slider 6 moves, provided of course with a projecting dovetailed portion, (not shown), which moves along the groove. This slider is also provided with a rack 7 cooperating with a pinion 8 driven by a motor 9. In other words, the motor can drive the slider back and forth through predetermined limits, as will be brought out in more detail below.

On the slider 6 there are two mounts 10 provided with tapped holes 11 receiving mounting screws which extend through camera back carrying brackets 12. For clarity the screws are not shown and of course the view shows only one of the two brackets, the other being concealed by the camera itself. The brackets are provided with slots 13 in which mounting screws 14, attached to the camera back 15, can slide to achieve precise vertical alignment of the camera back. The camera is provided with the conventional bellows 16, lens board 17 carrying lens 18 and mounted in a mounting 19 provided with three holes 20.

A double swivel having an upper portion 21 and a lower portion 22 extends through the hole 23 in the slider 6. The two portions of the double swivel can turn about their common axis independently of each other. The upper swivel carries a plate 24 provided with two projecting arms 25 and adjusting screws 26. The amount by which the plate 24 is rotated can be determined by the pointer 61 and the scale 62 on the slider 6. When the slider is moved by the motor 9 at its extreme positions, one or other adjusting screw 26 strikes one or other microswitch 27, which control the motor 9. They can either be ON-and-OFF switches or can be reversing switches depending on whether a number of continuous scans or only a single scan is desired. Of course the position of the adjusting screws 26 determines the travel of the slider 6 and once set to scan a given angle will remain constant for any object distance. If it is desired to change the angular scan, they may be adjusted accordingly.

The lower swivel portion 22 is provided with a driving or control rod 28 which is mounted fixedly into the swivel. The other end of the rod 28 moves slidably through a hole in a pivot 29 and at an intermediate position passes through a swivel 30. This latter swivel is mounted in a yoke 31 which moves on two guide rods 32, the motion being at right angles tot he movement of the slider 6. A second block 33 also slides on the rods 32 and is urged to the left by the two springs 34 which press against the yoke 31. Finally, there is another block 35 which is rigidly attached to the rods 32 and cannot slide thereon. This block carries a cam 36 pivoted at 37 and provided with an actuating arm 38. The cam surface bears on the slidable block 33. The cam contour is designed to follow the equation:

$$N = \frac{a - \sqrt{a^2 - 4af}}{2}$$

$a$=distance from film plane to position in the object plane of sharpest focus
$N$=distance of lens to film plane
$f$=focal length of lens.

It will be clear that a particular cam is useful only with a lens of particular focal length, and if a lens of different length is put in the lens board of the camera, another cam has to be used. This is an easy matter as the pivot 37 can be in the form of a shouldered pin tapped at its bottom. For clarity the pin itself is not shown.

The rods 32 end in a block 39 provided with a dovetailed projection 40 which slides in the groove 5.

Passing through the upper swivel portion 21, as is shown in the next to the top portion of the exploded view in FIG. 1, there is a focusing rod 41 with a handle 42. This rod passes through a block 43 provided with collars 44 on either side of the block. Of course only one of these appears in the figure.

The block 43 is provided with a projection 45 which fits into the hole 46 in the block 33. The block 43 also slides on two guides 47 which end in another block 48. The end of the shaft 41 is threaded and passes through a corresponding tapped hole in the slider 48, which slider is also provided with tapped holes 50 into which screws passing through the holes 20 of the lens board bracket 19 can be screwed in. For clarity these pins are not shown. In other words, the lens board of the camera is securely bolted to the block 48 and moves therewith.

An arm 49 is pivotally fastened to the lower side of the block 48 by means of a shouldered screw 51. The other end of the arm 49 is likewise pivotally attached to the actuating arm 38 of the cam 36 by means of another shouldered pin 52.

When the handle 42 is turned the lens board is moved to a point of sharp focus, the distance from the upper swivel portion 21 to the block 48 of course corresponding to "$a$" in the equation of the cam profile set out above.

Once the camera has been sharply focused as described above, then when the slider 6 is moved across the board 1 by means of the motor 9 the block 48, and with it the lens board, moves in a parallel line, the scanning and focusing distances having been previously set by the simultaneous positioning of the block 48 and the rotation of the cam 36 which is effected by turning handle 42.

FIG. 2 illustrates a modification of the linkage in which there are two driving rods 58 instead of a single driving rod 28 and of course two pivots 59 through which the rods 58 can slide precisely as was the case with the rod 28 in the pivot 29 in FIG. 1. Instead of a single swivel 30, there are two swivels 60 in a different shaped slider 53 which slides on a guide rod 54. This takes the place of the yoke 31 in FIG. 1.

The slider 53 is provided with two triangular tracks 54 on which a slide 55 moves. The other end of the slider 54 slides on a second guide rail 56, the motion being essentially the same as in FIG. 1, the guide rail 56 of course taking the place of the track 5 in the former figure. The sliding member 55 is provided with a swivel table 57 on which the camera lens board is bolted. In other words, the element 57 performs the same function or a similar function to the block 48 in FIG. 1.

FIG. 2 shows a very sturdy modification of linkage but does not illustrate automatic focusing by cam. This can of course be provided by suitable modification which is obvious.

The linkage of the present invention has been described in conjunction with a camera for taking photographs for stereoscopic viewing. As pointed out above, this is the most important single field of utility of the present invention. However, the linkage is not limited to this particular use and can be employed wherever travel of the same nature in scans is required. For example, instead of a camera back there may be a source of radiation to produce a projector. The source can be visible light or any other form of radiation, for example an X-ray tube. These other typical uses are not intended to restrict the invention but are merely illustrative of the fact that the linkage is not limited in its broadest aspects to a camera for stereoscopic photography.

For some uses it is desirable to trace an arc, and this can be done by providing a tracing element (not shown), at the end of the rod 41 beyond the crank 42.

The essentials of the present invention, that is to say, two sliders providing parallel motion, the second slider being driven by radius driving rods from one or more pivots in the first slider, and means for moving an element on the second slider to various positions at right angles to the direction of the two sliders, may be of different mechanical designs. Two typical designs, namely dovetail grooves and rods, have been illustrated, but it is not intended to limit the invention to this particular mechanical construction.

I claim:

1. A linkage for moving two elements parallel to each other through proportional distances comprising in combination,
   (a) a base framework,
   (b) two tracks near the ends of the framework parallel to each other,
   (c) a first slider movable along one of the two tracks, a multi-element mechanism having associated therewith a second slider movable along the second track, the first slider being provided with at least one swivel, driving rod means connecting the first slider and the mechanism associated with the second slider, said driving rod passing through swivel means on the first slider and on the mechanism associated with the second slider and also passing through a pivot mounted in the framework, whereby the swivel on the first slider turns the driving rod and it in turn moves the mechanism associated with the second slider,
   (d) means for adjusting the distance between the first slider and an element of the multi-element mechanism, said means comprising a rod passing through a swivel on the first slider but incapable of longitudinally sliding therethrough, said rod having a threaded portion engaging a female thread on the said element of the mechanism and means for turning the rod, whereby the distance from the first slider to said element in the mechanism is determined by the degree of rotation of said rod.

2. A linkage according to claim 1 in which means are provided for moving the first slider, said means being adjustable to provide predetermined travels for the first slider.

3. A linkage according to claim 1 in which the first slider is provided with two swivels and two rods moving the second slider.

4. A linkage according to claim 2 in which the first slider is provided with two swivels and two rods moving the second slider.

5. A stereoscopic camera mounted on a linkage according to claim 1 in which the back of the camera is attached to the first slider and the lens is attached to the female threaded element of the mechanism moving on the second slider.

References Cited

UNITED STATES PATENTS 2,175,114  10/1939  Friedman _____ 95—18
2,184,222  12/1939  Koppe _____ 95—4.5

JOHN M. HORAN, *Primary Examiner.*